(12) United States Patent
Siegel

(10) Patent No.: US 7,376,572 B2
(45) Date of Patent: May 20, 2008

(54) RETURN CENTERS WITH RULES-BASED DISPOSITIONING OF MERCHANDISE

(75) Inventor: Philip S. Siegel, Austin, TX (US)

(73) Assignee: Newgistics, Inc., Austin, TX (US)

( * ) Notice: Subject to any disclaimer, the term of this patent is extended or adjusted under 35 U.S.C. 154(b) by 129 days.

(21) Appl. No.: 10/750,705

(22) Filed: Jan. 2, 2004

(65) Prior Publication Data

US 2005/0137901 A1   Jun. 23, 2005

Related U.S. Application Data

(63) Continuation of application No. 09/796,337, filed on Feb. 28, 2001.

(60) Provisional application No. 60/185,960, filed on Feb. 29, 2000.

(51) Int. Cl.
  *G06Q 99/00* (2006.01)
(52) U.S. Cl. ......................................................... 705/1
(58) Field of Classification Search ....................... 705/1
  See application file for complete search history.

(56) References Cited

U.S. PATENT DOCUMENTS

| | | | |
|---|---|---|---|
| 5,715,314 A | 2/1998 | Payne et al. | 380/24 |
| 5,715,399 A | 2/1998 | Bezos | 395/227 |
| 5,724,424 A | 3/1998 | Gifford | 380/24 |
| 5,727,163 A | 3/1998 | Bezos | 395/227 |
| 5,812,668 A | 9/1998 | Weber | 380/24 |
| 5,815,657 A | 9/1998 | Williams et al. | 395/186 |
| 5,828,840 A | 10/1998 | Cowan et al. | 395/200.33 |
| 5,848,399 A | 12/1998 | Burke | 705/27 |
| 5,850,446 A | 12/1998 | Berger et al. | 380/24 |
| 5,860,068 A | 1/1999 | Cook | 705/26 |
| 5,878,139 A | 3/1999 | Rosen | 380/24 |
| 5,889,863 A | 3/1999 | Weber | 380/25 |
| 5,899,980 A | 5/1999 | Wilf et al. | 705/26 |
| 5,937,394 A | 8/1999 | Wong et al. | 705/26 |
| 5,943,424 A | 8/1999 | Berger et al. | 380/25 |
| 5,960,411 A | 9/1999 | Hartman et al. | 705/26 |
| 5,963,916 A | 10/1999 | Kaplan | 705/26 |
| 5,963,924 A | 10/1999 | Williams et al. | 705/40 |
| 5,963,949 A | 10/1999 | Gupta et al. | 707/100 |
| 5,970,469 A | 10/1999 | Scroggie et al. | 705/14 |
| 5,978,774 A | 11/1999 | Rogers et al. | 705/24 |
| 5,983,208 A | 11/1999 | Haller et al. | 705/40 |
| 5,984,508 A | 11/1999 | Hurley | 364/479.07 |
| 5,987,132 A | 11/1999 | Rowney | 380/24 |

(Continued)

OTHER PUBLICATIONS

Petersen, Scot, "Online purchases: Easy to get, hard to return." PC Week, Feb. 14, 2000.*

(Continued)

*Primary Examiner*—Jonathan Ouellette
(74) *Attorney, Agent, or Firm*—Baker Botts L.L.P.

(57) ABSTRACT

The present invention provides a method and system for processing returns at a return center. The return center accesses return rules of a merchant associated with an item of merchandise that has been returned by a customer. The item is then processed according to one or more of the return rules. The processing may include determining the eligibility of the return, notification to a merchant associated with the return, crediting of an account associated with the customer, and/or subsequent disposition of the return.

22 Claims, 4 Drawing Sheets

U.S. PATENT DOCUMENTS

| | | | |
|---|---|---|---|
| 5,987,140 A | 11/1999 | Rowney et al. | 380/49 |
| 5,999,924 A | 12/1999 | Bair et al. | 707/4 |
| 6,002,767 A | 12/1999 | Kramer | 380/24 |
| 6,003,024 A | 12/1999 | Bair et al. | 707/3 |
| 6,006,225 A | 12/1999 | Bowman et al. | 707/5 |
| 6,016,480 A | 1/2000 | Houvener et al. | 705/21 |
| 6,016,484 A | 1/2000 | Williams et al. | 705/39 |
| 6,018,719 A | 1/2000 | Rogers et al. | 705/24 |
| 6,029,150 A | 2/2000 | Kravitz | 705/39 |
| 6,085,172 A | 7/2000 | Junger | 705/28 |
| 6,188,994 B1 | 2/2001 | Egendorf | 705/40 |
| 6,192,347 B1 | 2/2001 | Graff | 705/36 |
| 6,321,211 B1 | 11/2001 | Dodd | 705/26 |
| 6,327,576 B1 | 12/2001 | Ogasawara | 705/22 |
| 6,497,408 B1 | 12/2002 | Walker et al. | 273/138.1 |
| 6,526,393 B1 | 2/2003 | Fredman | 705/408 |
| 6,536,659 B1 | 3/2003 | Hauser et al. | 235/375 |
| 6,547,136 B1 | 4/2003 | Sansone | 235/385 |
| 6,616,189 B2 | 9/2003 | Raming | 283/81 |
| 6,757,663 B1 | 6/2004 | Rogers et al. | 705/24 |
| 6,834,268 B2 | 12/2004 | Junger | 705/28 |
| 6,980,962 B1 | 12/2005 | Arganbright et al. | 705/26 |
| 7,062,473 B1 | 6/2006 | Taylor | 705/402 |
| 2001/0032141 A1* | 10/2001 | Drattell | 705/26 |
| 2001/0032143 A1 | 10/2001 | Haseltine | 705/26 |
| 2001/0032147 A1 | 10/2001 | Siegel | 705/26 |
| 2001/0037207 A1 | 11/2001 | Dejaeger | 705/1 |
| 2001/0037247 A1 | 11/2001 | Haseltine | 705/22 |
| 2001/0047315 A1 | 11/2001 | Siegel | 705/28 |
| 2002/0010634 A1 | 1/2002 | Roman et al. | 705/26 |
| 2002/0019777 A1* | 2/2002 | Schwab et al. | 705/26 |
| 2002/0019785 A1 | 2/2002 | Whitman | 705/28 |
| 2002/0032573 A1 | 3/2002 | Williams et al. | 705/1 |
| 2002/0032612 A1 | 3/2002 | Williams et al. | 705/26 |
| 2002/0095306 A1 | 7/2002 | Smith et al. | 705/1 |
| 2002/0128915 A1 | 9/2002 | Haseltine | 705/26 |
| 2002/0133425 A1 | 9/2002 | Pederson et al. | 705/26 |
| 2002/0138356 A1 | 9/2002 | Dutta et al. | 705/26 |
| 2002/0152093 A1 | 10/2002 | Chalmers et al. | 705/1 |
| 2002/0178076 A1 | 11/2002 | Ross | 705/26 |
| 2003/0023496 A1 | 1/2003 | De Mol Van Otterloo et al. | 705/22 |
| 2003/0061104 A1 | 3/2003 | Thomson et al. | 705/26 |
| 2003/0160097 A1 | 8/2003 | Steiner | 235/385 |
| 2004/0083179 A1 | 4/2004 | Sesek et al. | 705/53 |
| 2004/0172260 A1 | 9/2004 | Junger et al. | 705/1 |
| 2004/0194056 A1 | 9/2004 | Combs et al. | 717/104 |

OTHER PUBLICATIONS

UPS Autumn 2002 Forum, "The Far East is not so far," 12259 UPS Forum. ENG/SPEC 4 pages, Oct. 17, 2002.

U.S. Appl. No. 10/659,465 entitled "Method and System Using Return Labels with Dynamically Generated Multiple Datapoint Coding", filed by Edward J. Stashluk Jr. et al. on Sep. 10, 2003.

U.S. Appl. No. 10/697,485 entitled "Merchandise Return System with Value Addes Returnds Processing (Data Communication)", filed by Edward J. Stashluk, Jr. on Oct. 30, 2003.

U.S. Appl. No. 10/751,216 entitled "On-Line Merchandise Return Lables", filed by Philip S. Siegel on Jan. 2, 2004.

U.S. Appl. No. 10/750,935 entitled "On-Line Rules-Based Return Processing", filed by Philip S. Siegel on Jan. 2, 2004.

Machlis, "E-commerce = E-returns," Computerworld, v31, n51, Abstract, 1 page, Dec. 22, 1997.

U.S. Postal Rate Commission, "Opinion and Recommended Decision Approving Revised Stipulation and Agreement,", 35 pages, May 14, 1998.

Goldblatt, "Stores, Online Retailers Prepare for Returns," Knight-Ridder Tribune Business News, 1 page, Dec. 29, 1999.

Petersen, "Online Purchases: Easy to get, hard to return," PC Week, 30, 2 pages, Feb. 14, 2000.

"Cattron acquires Theimeg," Modern Materials Handling, Boston, vol. 55, Iss. 11, 2 pages, Oct. 2000.

"J. Crew Selects Newgistics' Return Valet Service for Managing Product," Business Wire, 3 pages, Jan. 14, 2002.

"Carrier Route Definitions," CarrierRoutes.com, 6 pages, 2006.

* cited by examiner

RETURN CENTERS WITH RULES-BASED DISPOSITIONING OF MERCHANDISE

CROSS REFERENCE TO RELATED APPLICATION

This application is a Continuation of U.S. patent application Ser. No. 09/796,337, entitled "Method and System for Processing the Local Return of Remotely Purchased Products" filed on Feb. 28, 2001, which claims the benefit of U.S. Provisional Application No. 60/185,960, filed Feb. 29, 2000.

TECHNICAL FIELD

The present invention relates generally to electronic commerce. More particularly, the present invention relates to a method and system for processing the returns of remotely purchased products at a return center.

BACKGROUND OF THE INVENTION

In contrast to retailing on the Internet, brick and mortar retail stores generally accept product returns at the retail location from which the products are purchased and/or at an affiliated retail location. Upon returning their unwanted purchases, either to a sales or consumer service counter, consumers generally expect to immediately receive cash or a credit for their returns.

Upon receiving such a return, retailers typically assess the condition of the returned item and either put it back on the shelf for resale or, for products that are defective or inappropriate for retail sale, the returned items may be aggregated in a stock room until enough products are accumulated to justify a bulk shipment to a centralized return center. At the centralized return center, the condition of the returned products are typically again evaluated and subsequently routed to an appropriate destination such as an outlet store, manufacturer, landfill, etc. In such a scenario, multiple shipments and redundant return processes for the same individual item are common, thereby adding to the cost of product returns for participants in a retail channel.

With the addition of another costly shipping step at the beginning of the procedure, this procedure is generally the same for catalog retailers. While catalog retailers continue to sell products around the nation and around the world, electronic commerce via the Internet is expanding the practice of remote sales and purchases of products at a phenomenal pace. Due to the fact that a vast majority of electronic commerce sites are not equipped with brick and mortar counterparts, many electronic commerce sites and their consumers are likely to experience limitations associated with current methods of returning remotely purchased products.

The advent of Internet retailing has produced a new retail channel. However, product return processes associated with many Internet retailers are generally similar to the process for catalog retailers mentioned above. In the absence of brick and mortar counterparts, consumers of many Internet retailers are often required to ship products to an Internet retailer's designated location for return. From there, the costly process of shipping and handling returned products back through the retail channel continues similar to traditional brick and mortar retailers. Currently, Internet and catalog retailers continue to use traditional, inefficient product return processes that involve the aggregation of returned products as well as the use of multiple shipping and handling steps before final disposition.

SUMMARY OF THE INVENTION

The present invention is primarily concerned with difficulties resulting from current methods of returning remotely purchased products. As electronic commerce continues to grow, and as mail order and catalog retailing keeps pace, problems associated with returning products purchased from remote retailers will only affect more and more consumers. The invention disclosed herein solves many of the problems a consumer and a remote retailer may face when the consumer decides to return products purchased from the remote retailer.

In accordance with teachings of the present disclosure, a system and method are described for a more efficient logistics process that generally eliminates unnecessary shipping and handling of returned products. By using Internet technologies and a set of product return guidelines, decentralized handling of product returns may direct remotely purchased product returns to their least costly method of final disposition. As such, the present invention discloses a logistics process that will provide consumers with a convenient way to return unwanted products to remote retailers as well as provide remote retailers with a logistics solution that is generally superior, in both speed and cost, to current methods.

One embodiment of the present invention provides for local return of remotely purchased products or goods. The associated remote retailer is preferably informed that a product return is in progress, via an integrated Internet back-end process. This notification preferably includes an identification of the account and order number of the consumer. Subsequently, disposition of the returned product may be determined based on guidelines that generally eliminate unnecessary shipping and handling. As such, once the returned product is in the control of a local returns agent, it may be immediately and automatically processed for disposition. If the returned product is selected for liquidation, it may be automatically listed on an associated Internet auction web site where it is preferably liquidated via online auction.

In one embodiment, a method for processing local return of products purchased from one or more of a plurality of remote retailers is provided. The method preferably includes the step of gathering transaction information regarding a remotely purchased product from a consumer. A determination regarding eligibility of the product for return based on a set of product return guidelines is also preferably included in the method. The steps of collecting the product, if eligible for return, at a centralized location and disposing of the returned product based on the set of product return guidelines are also preferably included in the method.

In a further embodiment, a method for processing the local return of a remotely purchased product by a consumer using a catalog, a worldwide computer communications network or other technique for directly selling to the consumer is provided. The method preferably includes gathering information concerning the remotely purchased product from the consumer. Maintaining at least one set of product return guidelines is also preferably included in the method. Determining eligibility of the product for return based on the set of product return guidelines and collecting the product if determined eligible for return are additional steps that may be preferably included in the method. The steps of determining a preferred method for disposal of the collected product and disposing of the collected product according to the preferred method for disposal may also be included in the method.

In another embodiment, a method for enabling local return of remotely purchased products is provided. Steps preferably implemented in such an embodiment include providing access to product return guidelines for a plurality of remote retailers and gathering information regarding a transaction for a remotely purchased product from a consumer. In addition, the steps of determining eligibility for returning the product based on the product return guidelines and collecting products eligible for return at a local return collection site may also be included in the method. Disposing of collected product returns based on the product return guidelines is yet another step that may be included in the method.

In yet a further embodiment, a system for processing the local return of products purchased from one or more remote retailers is provided. The system preferably includes at least one client system and at least one server system operably coupled to the client system. At least one database operably coupled to the server system, the database including product return guidelines for the one or more remote retailers, is also preferably included in the system. The at least one client system is preferably operable to display at least a portion of the product return guidelines and the server system is preferably operable to gather information regarding a purchase from the one or more remote retailers according to an embodiment of the system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
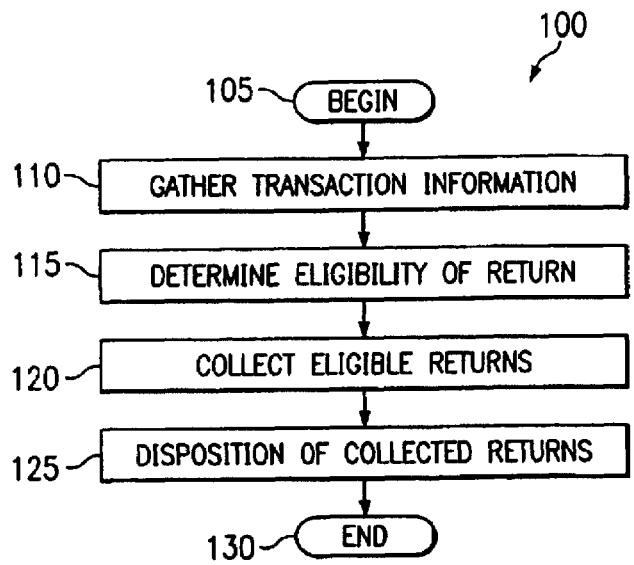
FIG. 1 shows a schematic drawing of a flow diagram for one method of processing the local return of remotely purchased products incorporating teachings of the present invention.

Preferred embodiments of the present invention and its advantages are best understood by referring to the FIGS. 1 through 5 of the drawings, like numerals being used for like and corresponding parts of the various drawings. Referring first to FIG. 1, a flow diagram depicting a method for performing the local return of remotely purchased products is illustrated. Method 100 of FIG. 1 preferably enables a consumer to rapidly effect the return of products or goods purchased remotely, such as through the Internet, mail order, catalogs, etc., without having to cooperate directly with the remote seller of the products.

As such, method 100 may be implemented at a brick and mortar site set up to facilitate the functions depicted in FIG. 1 and taught by the present invention. The brick and mortar site may be operated by an independent entity which is not associated with any specific remote retailer. Alternatively, the brick and mortar site may be an independent entity which is associated with one or more remote retailers. In another example, an Internet site operable to perform teachings of the present invention and method 100 as depicted in FIG. 1 may be constructed and provided. Further detail concerning the implementation of method 100 of FIG. 1 will be described below. In addition, other implementations of method 100 are considered within the scope of the present invention.

Upon beginning at step 105, generally in response to a consumer's decision to return a product purchased remotely, method 100 may proceed generally as illustrated in FIG. 1. As such, at step 110, transaction information regarding the remotely purchased product is preferably gathered from the consumer. At step 115, the eligibility of one or more product returns may be determined. Eligible returns are individually, uniquely labeled for identification and tracking. Upon the determination of the eligibility of one or more product returns at step 115, the eligible returns are preferably collected at step 120. Once the one or more eligible returns have been collected, the collected returns are preferably disposed of at step 125. Subsequently, method 100 preferably ends at step 130. Additional detail regarding the steps of method 100 is included below.

Figure 2:
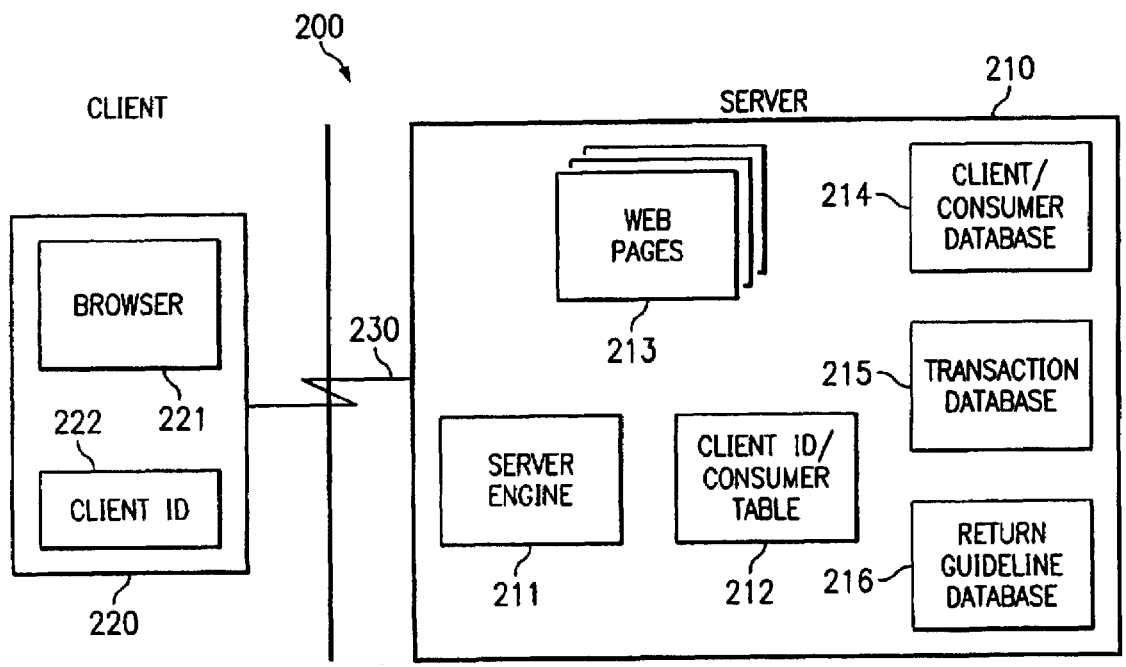
FIG. 2 shows a schematic drawing of a system for processing the local return of remotely purchased products incorporating teachings of the present invention.

FIG. 2 is a schematic diagram depicting one embodiment of a system incorporating teachings of the present invention which is capable of facilitating the local return of remotely purchased products or goods. System 200 preferably supports communication over the Internet using the World Wide Web and related technologies.

Server system 210 may include server engine 211, client identifier/consumer table 212, web page template database 213, client/consumer database 214, transaction database 215 and return guidelines database 216. Server engine 211 may receive HTTP (Hypertext Transfer Protocol) requests to access web pages identified by URLs (Universal Resource Locator) and provide web pages to various client systems 220. Using web page template database 213 in conjunction with data preferably included in return guidelines database 216, consumers may gather information about one or more remote retailers' product return guidelines via client system 220, server system 210, communications link 230 and a product return guidelines web site incorporating teachings of the present invention.

In one embodiment, client/consumer database 214 may contain client/consumer information associated with previous consumers using the local return system of the present invention. Client/consumer information may include consumer-specific return information such as the name of a consumer credit information for a consumer, and consumer preferred shipping information in a consumer preference profile. Transaction database 215 may contain entries indicative of transactions associated with consumers and remote retailers, preferably transactions which were performed at remote retailers cooperating with a brick and mortar location or a web site incorporating teachings of the present invention. Return guidelines database 216 preferably contains return guidelines for one or more remote retailers preferably participating in a local return of remotely purchased products program or for the local return center itself. However, return guidelines database 216 may contain product return guidelines for other retailers.

Client/consumer identifier table 212 may contain a mapping from a client identifier, which is an identifier that identifies a client system 220, to the consumer last associated with a particular client system 220. Client system 220 preferably contains browser 221 and a client identifier 222. The client identifier 222 may be stored on client system 220 in a file as a "cookie." In one embodiment, server system 210 assigns and sends client identifier 222 to client system 220 when client system 220 first interacts with server system 210. From then on, client system 220 preferably includes client identifier 222 with all messages sent to server system 210 so that server system 210 may identify the source of a communication.

Server system 210 and client system 220 may interact by exchanging information via communications link 230, which preferably includes transmission over the Internet. Server system 210 may also retrieve transaction information, return guidelines or other information from various databases remotely located, with respect to server system 210, via communications link 230.

One skilled in the art can appreciate that the local return of remotely purchased products teachings of the present invention may be used in various environments other than the Internet. For example, various communication channels may be used such as one or more connected local area networks, wide area networks, or point-to-point dial up connections.

Server system 210 may comprise any combination of hardware or software capable of processing returns in accordance with teachings of the present invention. Similarly, client system 220 may comprise any combination of hardware or software operable to interact with server system 210. Systems 210 and 220 may include television-based systems or various other consumer products capable of electronic commerce transactions.

Figure 3:
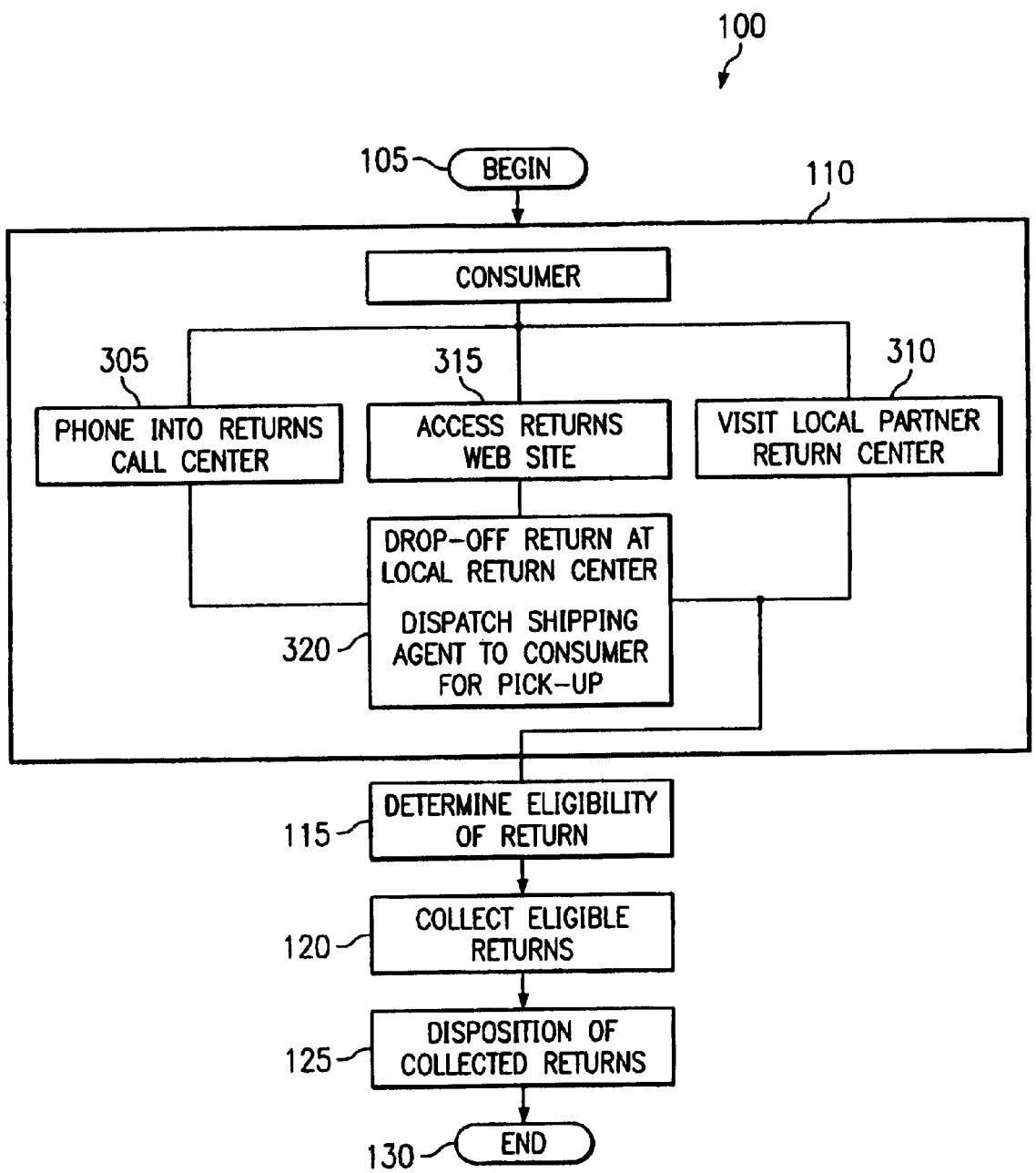
FIG. 3 shows a schematic drawing depicting one embodiment of a subroutine incorporating teachings of the present invention which may be implemented as part of the method illustrated in FIG. 1.

Referring now to FIG. 3, a schematic diagram illustrating one method by which step 110 of method 100 may be implemented is shown. As mentioned above, once a consumer has made the decision to return a product purchased remotely, transaction information regarding the remote purchase is preferably gathered from the consumer. As illustrated in FIG. 3, there are a variety of methods which may be employed to gather transaction information from a consumer. Examples of such transaction information may include the name of the remote retailer, the date of purchase, account used for purchased, etc.

In one alternative, as indicated at 305, the consumer may decide to phone into a local return call center, a brick and mortar location not unlike a postal office or similar location, to discuss their prospective return with a local return agent located therein. During such a discussion, the consumer preferably provides the local return agent with transaction information regarding the remote purchase. Providing this transaction information enables the local return agent to proceed with the local return method 100 of FIG. 1. Similarly, as indicated at 310, the consumer may choose to visit a local return brick and mortar location and provide a local return agent located therein with transaction information regarding the remote purchase to be returned.

As indicated at 315, it may also be possible to implement step 110 using one or more electronic commerce technologies. In one such electronic commerce implementation, a web site may be provided, such as by server system 210, which is preferably configured to gather transaction information regarding a remote purchase of products from a consumer. Upon visiting such a local return enabled web site, the consumer may be prompted, via conventional web programming methods, such as a web page from web page template database 213, for transaction information. In another embodiment, a "cookie", such as client identifier 222, may be retrieved from the client system 220 being employed by the consumer which contains at least a portion of transaction information preferred to effect the local return of remotely purchased products. According to teachings of the present invention, the web site provided at 315 may be accessible from a remote client system 220 as well as from a client system 220 locally maintained at a brick and mortar local return center. Other embodiments of gathering transaction information from a consumer are considered within the scope of the present invention.

Once the transaction information has been gathered from the consumer, the product to be returned is preferably visually inspected before a determination is made regarding the eligibility of the product for return. In situations where the consumer has either phoned into a local return call center, as indicated at 305, or accessed a local return enabled web site, as indicated at 315, it may be necessary for a local return agent to obtain the product to be returned. As such, and as indicated at 320, the consumer may drop off the product to be returned at a brick and mortar local return center or, a shipping agent may be dispatched to a location indicated by the consumer to allow the product return to be collected.

Figure 4:
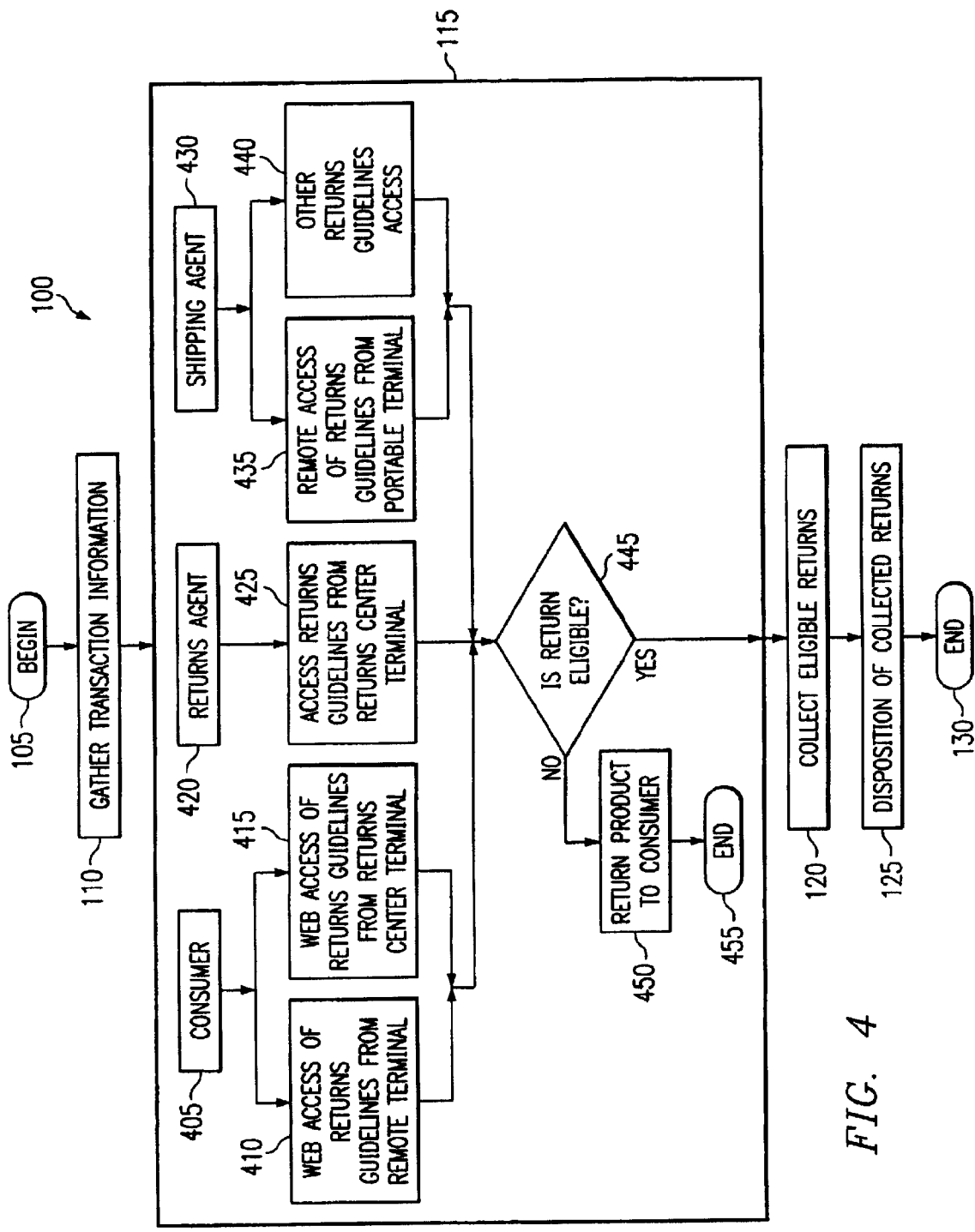
FIG. 4 shows a schematic drawing depicting one embodiment of a subroutine incorporating teachings of the present invention which may be implemented as part of the method illustrated in FIG. 1.

Depending on who has control of a remotely purchased product, there are a variety of methods by which the product may be evaluated for eligibility for return. Referring now to FIG. 4, an assortment of methods for determining a product's eligibility for return are illustrated. In one embodiment, as indicated at 405, the eligibility of a product for return may be performed by the consumer. For example, during the consumer's visit to a local return enabled web site, whether from a remote client system 220 as indicated at 410, or from a client system 220 locally maintained at a brick and mortar local return center as indicated at 415, the consumer may access return guidelines database 216.

The local return enabled web site is preferably configured to display product return guidelines for one or more remote retailers or for the local return center using web page template database 213 and functionality preferably included on server system 210. Using the product return guidelines presented on the web site, the consumer will preferably be able to follow a checklist or a step by step methodology to determine whether or not the product they purchased may be eligible for return. Upon such a determination by the consumer, eligible product returns are preferably collected as described below.

In the situation where a local return agent located at a brick and mortar local return center has one or more product returns in hand, as indicated at 420, the local return agent may access return guidelines database 216 to determine whether or not the product may be eligible for return, as indicated at 425. Similar to that provided to the consumer, the local return agent may access a web site configured to display product return guidelines and/or a checklist for one or more remote retailers on a client system 220 maintained at the local return brick and mortar site. Upon accessing return guidelines database 216, the local return agent may then determine the eligibility of the product for return. Such an implementation enables the local return agent to use the product return guidelines available through return guidelines database 216 and server system 210 in a manner similar to that available to a consumer and as described above.

As indicated at 430, it may be preferred that a shipping agent, such as a United Parcel Service (UPS) or Rapid Parcel Service (RPS) representative, act or serve as the local return agent when picking up a product return from a consumer for shipping. To enable the shipping agent to accurately determine a product's eligibility for return, the shipping agent may have access to return guidelines database 216 from a remote device such as a portable computer, PDA (personal digital assistant), or similarly enabled data terminal in the shipping agent's possession. Alternatively, the shipping agent may arrive at the consumer's preferred pick-up site with a checklist generated from return guidelines database 216 indicative of the product return guidelines for the remote retailer from which the consumer purchased the product return. In a further embodiment, the shipping agent may log the product return, preferably using their remote device, with server system 210 such that the remote retailer from which the return was originally purchased is notified, preferably including a consumer account and order number, etc., of the impending return as well as to credit a consumer account for the product's return. As indicated at 440, there may be other methods of enabling a shipping agent to access return guidelines database 216 such that the eligibility of a consumer's product return may be determined.

Upon inspection of the product for return, whether performed by the consumer, the local return agent or the shipping agent, a determination is preferably made regarding the eligibility of the product for return based on product return guidelines available in return guidelines database 216 or in a database accessible via communications link 230. Such an eligibility determination is preferably made at 445. Should the product desired to be returned by the consumer be deemed ineligible or non-returnable, the consumer is preferably notified and the product is returned to the consumer where appropriate, as indicated at 450. Subsequently, method 100 preferably ends at 455. Should the consumer's product be determined eligible for return, method 100 preferably proceeds to step 120 where collection of products to be returned may be effected.

The collection of products to be returned is primarily concerned with consolidating product returns prior to their disposal or final disposition at step 125. If a consumer utilizes a local return enabled web site or phones into a local return call center, the product may be collected by a shipping agent dispatched for pick-up and subsequently shipped to a local return brick and mortar site or other designated collection site. In the situation where the consumer has visited a local return brick and mortar site, the product may be collected by an employee or local return agent located therein and subsequently shipped to a collection site or held at the brick and mortar local return center. In one embodiment, if the remote retailer from which the product was originally purchased is a local return program participant, the consumer may be credited for their product return upon collection. Once the eligible returns have been preferably collected, method 100 may proceed to step 125 for the preferred disposal of the collected product. One advantage, provided by teachings of the present invention, involves the flexibility with which returned products may be disposed.

Figure 5:
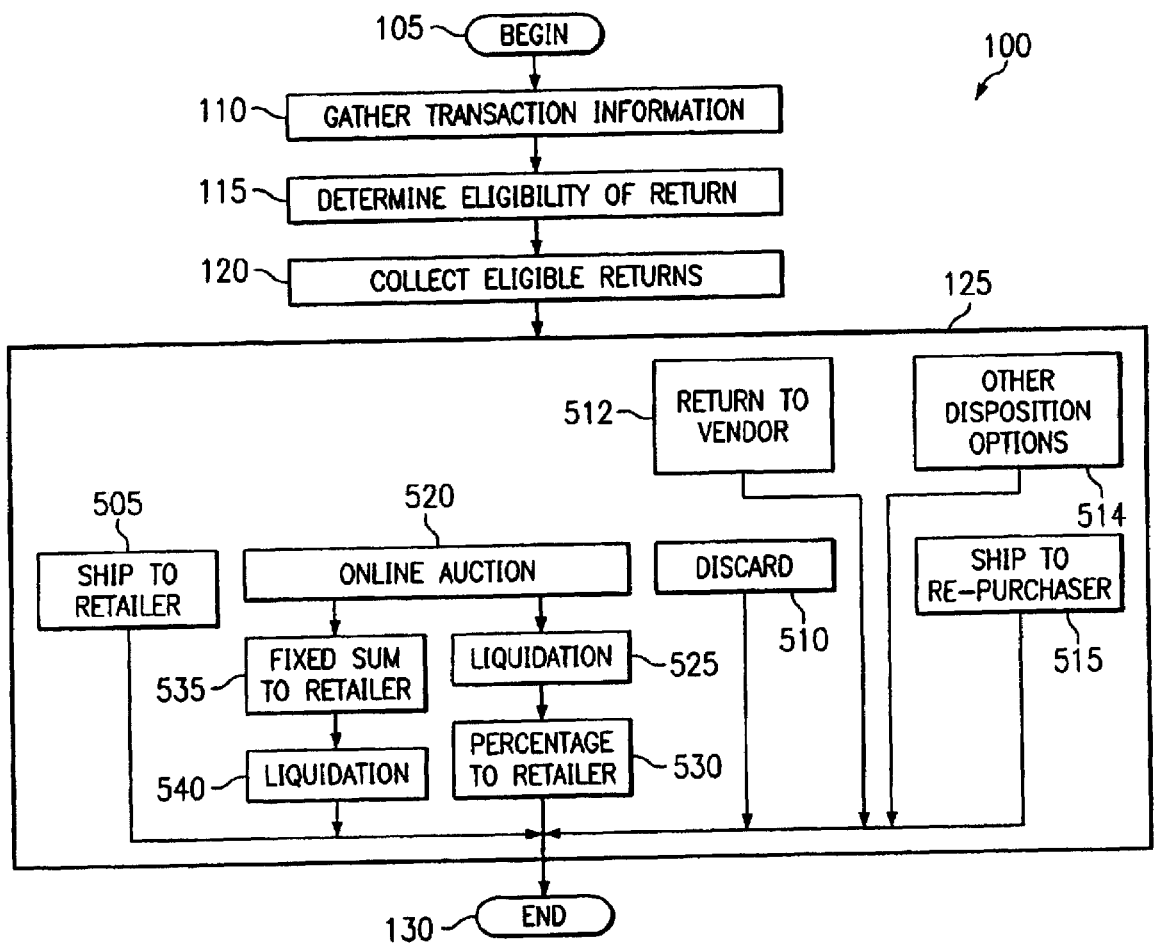
FIG. 5 shows a schematic drawing depicting one embodiment of a subroutine incorporating teachings of the present invention depicting final disposition processes which may be implemented as part of the method illustrated in FIG. 1.

Referring now to FIG. 5, a variety of disposal or final disposition methodologies that may be performed at step 125 of method 100 are shown. The disposal of product returns at step 125 of method 100 is preferably determined by guidelines included in return guidelines database 216 or other return guidelines database. For example, a remote retailer may direct that product returns belonging to them be shipped to the remote retailer's product collection site as indicated at 505. Alternatively, guidelines in return guidelines database 216 may direct the local return center to destroy and discard any collected product returns belonging to them, as indicated at 510. The item might also be returned to the vendor or disposed of in some other manner, as indicated by Steps 512 and 514.

However, in the interest of economics, resale of returned products in one form or another is likely to be the option chosen by most remote retailers. One method for facilitating the resale of returned products may be performed as indicated at 515. At 515, the remote retailer from which a returned product was originally purchased may instruct the local return center to hold the product at the local return center brick and mortar site until the remote retailer is able to resell the product. Upon reselling the returned product, the remote retailer may then instruct the local return center to ship the returned product to a new purchaser, the returned product thereby never returning to the remote retailer. This method of product redistribution reduces the shipping cost on both the remote retailer and the original purchaser. In addition to the reduction in shipping charges, such a scenario reduces the amount of warehouse space and labor hours the remote retailer would likely have to contend with should the product be returned to the remote retailer's facilities.

In another embodiment of reselling product returns, an auction site may be employed as indicated at 520. Although a physical auction site may be employed, an Internet or online auction web site is preferred. In such a scenario, there may be a variety of financial arrangements that can be made between the local return center and the remote retailer to make the online auction of products economical for both parties. For example, the local return center may liquidate the product returns through an online auction web site, as indicated at 525, and divide the proceeds of any product sales between the remote retailer from which the product was originally purchased and the local return center, as indicated at 530. Alternatively, the local return center may purchase the product returns from the remote retailer from which they were originally purchased, as indicated at 535, and subsequently liquidate the purchased product returns via an online auction, as indicated at 540. The proceeds of the online auction then belonging solely to the local return center.

Although the present invention has been described in detail, it should be understood that various changes, substitutions and alterations can be made thereto without departing from the spirit and scope of the invention.

What is claimed is:

1. A method for processing returned items of merchandise; comprising the steps of:
dispatching a local return agent to a location identified by a consumer associated with an item for return, the location remote from any return center, the local return agent comprising a shipping agent;
providing returns guidelines to the local return agent over a communications link, the returns guidelines for use by the local return agent in making a determination at the location remote from any return center as to the eligibility of an item for return, the local return agent authorized to make the determination on behalf of a merchant;
receiving an item remotely determined to be eligible for return at the return center;
accessing one or more return rules of the merchant associated with the item; and
processing the return in accordance with the return rules.
2. The method of claim 1, wherein the method is performed by a third party on behalf of the merchant.

3. The method of claim 2, wherein the method is performed for multiple merchants.

4. The method of claim 1, further comprising the step of electronically delivering notice of the return to a merchant associated with the return.

5. The method of claim 1, wherein the processing step is performed by determining a final destination of the return.

6. The method of claim 1, wherein the processing step is performed by determining disposition of the return.

7. The method of claim 1, wherein the accessing step is performed via the Internet.

8. The method of claim 1, wherein the processing step is performed by returning an ineligible return to the customer.

9. The method of claim 1, wherein the processing step is performed by shipping the item to a location maintained by a merchant associated with the item.

10. The method of claim 1, wherein the processing step is performed by assigning the item to an on-line auction.

11. The method of claim 1, wherein the processing step is performed by shipping the item to a re-purchaser.

12. The method of claim 1, further comprising the step of labeling the item for subsequent processing.

13. The method of claim 1, wherein the receiving step is performed by receiving the item from a carrier.

14. The method of claim 1, wherein the receiving step is performed by receiving the item directly from a customer.

15. The method of claim 1, further comprising the step of inspecting the item at the returns center.

16. The method of claim 1, further comprising the step of consolidating items to be shipped to a common destination.

17. The method of claim 1, further comprising the step of crediting an account associated with a customer associated with the return.

18. The method of claim 1, further comprising the step of accessing transaction data associated with the item.

19. A merchandise return system for use by a return center, comprising a computer system programmed to:
provide returns guidelines to a local return agent over a communications link, the local return agent comprising a shipping agent dispatched to a location identified by a consumer associated with an item for return, the location remote from any return center, the returns guidelines for use by the local return agent in making a determination at the location remote from any return center as to the eligibility of an item for return, the local return agent authorized to make the determination on behalf of a merchant;
receive data identifying an item remotely determined to be eligible for return received at the return center;
access one or more return rules of a merchant associated with the item; and
provide information for processing the return in accordance with the return rules.

20. The system of claim 19, wherein the system is at least in part implemented by a network that communicates with the return center via the Internet.

21. A computer product for facilitating merchandise returns, the computer product having instructions for:
providing returns guidelines to a local return agent over a communications link, the local return agent comprising a shipping agent dispatched to a location identified by a consumer associated with an item for return, the location remote from any return center, the returns guidelines for use by the local return agent in making a determination at the location remote from any return center as to the eligibility of an item for return, the local return agent authorized to make the determination on behalf of a merchant;
receiving data identifying an item remotely determined to be eligible for return received at the return center;
accessing one or more return rules of a merchant associated with the item; and
providing information for processing the return in accordance with the return rules.

22. The computer product of claim 21, wherein at least one of the steps is performed via the Internet.

* * * * *